April 19, 1932.  T. W. MILLER  1,854,415
SOAP CONTAINER
Filed Aug. 18, 1930
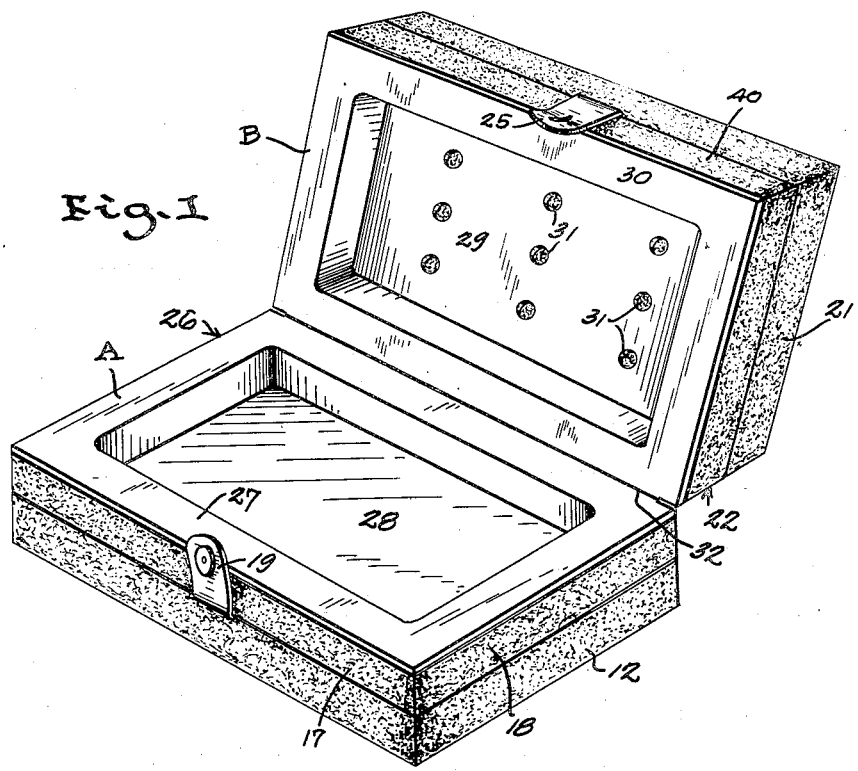
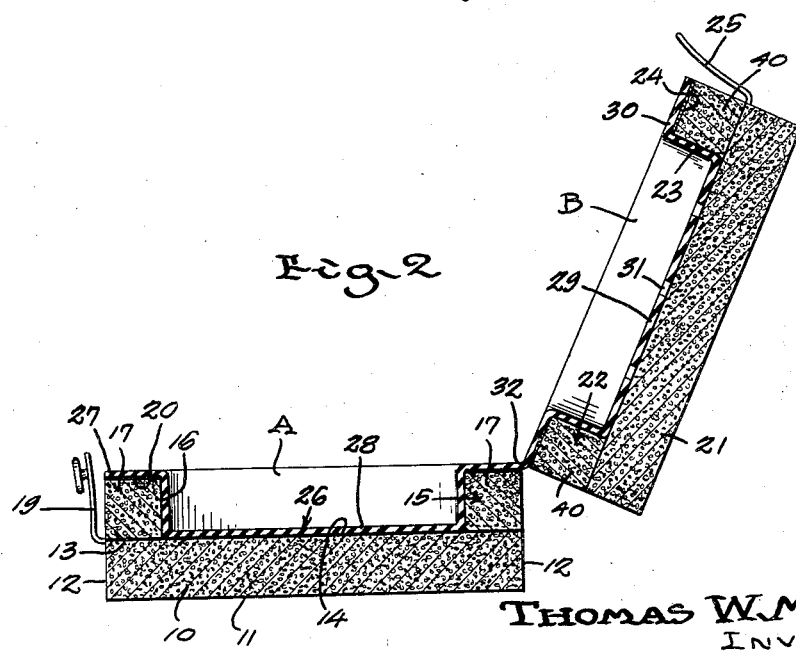
THOMAS W. MILLER
INVENTOR
By Smith and Freeman
ATTORNEYS Patented Apr. 19, 1932

1,854,415

UNITED STATES PATENT OFFICE

THOMAS W. MILLER, OF ASHLAND, OHIO, ASSIGNOR TO THE FAULTLESS RUBBER COMPANY, OF ASHLAND, OHIO, A CORPORATION OF OHIO

SOAP CONTAINER

Application filed August 18, 1930. Serial No. 476,216.

This invention relates to soap containers and has for an object the provision of a new and improved article of this type and a process of making the same.

In the drawings accompanying this specification and forming a part of this application I have shown, for purposes of illustration, certain forms which my invention may assume, and in these drawings:

Figure 1 is perspective view of an embodiment of the invention, while

Figure 2 is a transverse sectional view through said embodiment.

The embodiment herein shown comprises a base member A and a cover member B. The base member A comprises an elongated rectangular section 10 of rubber sponge having the rind or skin removed from its bottom face 11 as well as from the side faces 12, thus to expose the cellular structure of the sponge rubber, while the upper face 13 has remaining thereon a skin or rind 14, resulting from the molding operation, and which extends entirely across the upper surface 13 of the section 10. A section 15 is provided, consisting of a block of material similar to the section 10, but recessed as indicated at 16 so as to provide side and end walls 17 and 18 with exposed cut sponge surfaces, the lower surfaces of the walls 17 and 18 resting upon the skin or rind 14 of the section 10 along the marginal edges thereof, and being secured thereto, as by rubber cement, a fastening flap 19 being disposed between the sections 10 and 15 prior to the cementing operation. The upper surfaces of the walls 17 and 18 have portions 20 of the skin, resulting from the molding operation, remaining thereon.

The cover member B comprises an elongated rectangular section 21 of sponge rubber of a size corresponding to the base member A, and having exposed cut sponge rubber surfaces on all sides, whereby continuous porosity is obtained. Secured, as by rubber cement, to the inner surface of the section 21 is a complemental section 22, recessed as at 23 in the same manner as the section 15, and having portions of skin or rind 24 still remaining thereon. A fastening tab 25 is secured between the sections 21 and 22 prior to the cementing operation and is adapted to cooperate with the flap 19. It will be understood that all of the sections 10, 15, 21, and 22 may be of differently colored sponge rubber if desired.

The base member A and cover member B are hingedly connected together by a continuous sheet of rubber 26, one end 27 of which is cemented to the adjacent skin 20 of the outer side wall 17 of the section 15, cemented also to form an imperforate lining 28 for the recess 16, cemented, as by rubber cement, to the opposite side wall 17 of the section 15, extending thence continuously and secured to the skin portion 24 of the adjacent side wall 40 of the cover B, extending thence to provide a lining 29 for the recess 23 of the section 22, and having its end 30 secured to the outer surface of the skin 24 of the opposite wall 40 of the section 22. The lining 29 is perforated as at 31 to establish communication with the porous body of the section 21.

The base member A and cover member B are thus hingedly connected together, and may be fastened in closed position by means of the fastening members 19 and 25, the cavity provided by the combined recesses 23 and 16 serving as a chamber for the reception of soap or the like.

In use, a cake of soap may be placed within the receptacle and any water or liquid in the cavity may be readily drained through the openings 31 and the porous section 21 of the cover B. Also the soap tray may be utilized as a bath sponge; that is by placing the cake of soap within the receptacle and securing the fastening members 19 and 25, it is possible for moisture to pass through the porous section 21, and apertures 31, into the soap recess, generating a lather which also may pass through the porous section 21 of the cover member B, thus enabling the porous section 21 to be used as a soapy sponge to be applied to the object to be washed. Also due to the imperforate lining 26 of the base member A, no moisture can pass from within the soap cavity through the section 10, and consequently the section 10 may be used as a rinsing sponge.

In providing the base member A and cover member B I employ the following method. I form a relatively thin rectangular slab of vulcanized, cellular sponge rubber in a mold, the molded rubber being covered on all of its sides with a smooth skin or rind enclosing the sponge rubber body. This slab of material is then trimmed along its four edges so as to expose cut sponge rubber surfaces, leaving the skin or rind intact upon its opposite broad faces.

In forming a receptacle, corresponding to the base member A, I first split the slab lengthwise, substantially parallel to the broad surfaces thereof and form a base section, corresponding to the base section 10 having the skin 14 thereon. The complemental section, comprising the other portion of the slab, and corresponding to the section 15, is then perforated by a suitable machine to form a recess like the recess 16, leaving the skin or rind portions similar to 20, upon the complemental section 15. The cut edges of the complemental section are then placed upon the surface 13 of the section, corresponding to the section 10, in abutting relation with the skin corresponding to the skin 14, and cemented in position.

The cover member B is formed in identically the same manner, except that the section, corresponding to the section 21 is cemented to the section 22, but the skin or rind, which would correspond to the skin or rind 14 is removed, in order to render the section 21 porous.

It will be apparent to those skilled in the art that the embodiments herein described accomplish at least the principal objects of the invention; it also will be apparent that said embodiments have advantages and may be applied to uses other than those herein mentioned; furthermore that various changes and modifications may be made within the scope of the claims without departing from the spirit of the invention; accordingly it will be understood that the embodiments herein disclosed are illustrative only and that the invention is not limited thereto.

I claim:

1. A receptacle comprising complemental recessed portions of sponge rubber with the cellular structure of the sponge rubber exposed along the exterior surfaces of said portions; and an inner lining for said complemental portions extending continuously from one to the other and providing a hinged connection for said portions.

2. A receptacle having complemental recessed portions adapted to contain soap, and comprising defining walls of sponge rubber with the cellular structure of the sponge rubber exposed along the exterior surface of said receptacle, one portion of said sponge rubber having its skin removed to provide a porous area for the ingress and egress of moisture with respect to said soap chamber; and an inner lining for said portions apertured opposite said porous area.

3. A receptacle having complemental recessed portions providing a chamber for soap, and comprising defining walls of sponge rubber, with the cellular structure of the sponge rubber exposed along the exterior surface of said receptacle; and an inner lining covering all the walls of said portions.

4. A sponge rubber article comprising: a recessed body portion having walls of sponge rubber defining a receptacle, and a lining overlying the entire interior thereof.

5. A sponge rubber article having a body portion comprising a plurality of sections of sponge rubber, provided with complementary recesses lining for said recesses one of said linings being perforated and united with the lining of the other section, said sections together forming the defining walls of a receptacle.

6. The method of making a sponge rubber article from sponge rubber block having a skin thereon, which comprises: splitting the sponge rubber block into a plurality of pieces, without removing the skin; perforating one of the split pieces; and uniting the perforated piece with another split piece to form a receptacle, with skin incorporated as reenforcing means, and to form the bottom of the receptacle.

7. A sponge rubber receptacle comprising: a base portion; a peripheral sponge rubber wall secured to said base portion; a sponge rubber cover for said receptacle; a sheet rubber hinge connecting said cover with said wall; and means for releasably maintaining said cover closed.

8. A sponge rubber receptacle comprising: a sponge rubber base portion having a reinforcing skin on one side only thereof; a peripheral sponge rubber wall secured to the skin of said base portion; a sponge rubber cover for said receptacle; a sheet rubber hinge connecting said cover with said wall; and means for releasably maintaining said cover closed.

9. A sponge rubber receptacle comprising: a sponge rubber base portion having a reinforcing skin on one side only thereof; a peripheral sponge rubber wall secured to the skin of said base portion; a sponge rubber cover for said receptacle having the skin removed from both sides thereof for the escape of moisture from said receptacle; and a sheet rubber hinge connecting said cover with said wall.

10. A sponge rubber receptacle comprising: a sponge rubber base portion having a skin on one side only thereof for reinforcing said receptacle; a peripheral sponge rubber wall secured to the skin of said base portion; a sponge rubber cover for said receptacle having the skin removed from both sides thereof; and a moisture impervious lining secured to said base portion and walls and to said cover, and forming a flexible connection therebetween, the portion of the lining which is secured to said cover being provided with a plurality of apertures for the escape of moisture from said receptacle through the cellular structure of said cover.

11. A sponge rubber receptacle comprising: a first section provided with a sponge rubber base portion; a peripheral sponge rubber wall secured to one side of said base portion; a second section provided with a sponge rubber base portion; a peripheral sponge rubber wall secured to one side of said second mentioned base portion for cooperation with the wall of said first section; and a sheet rubber hinge secured to adjacent walls of said first and second sections.

12. A sponge rubber receptacle comprising: a first section provided with a sponge rubber base portion having a skin on one side only thereof; a peripheral sponge rubber wall secured to the skin of said base portion; a second section provided with a sponge rubber base portion having the skin removed from both sides thereof; a peripheral sponge rubber wall secured to one side of the second mentioned base portion for cooperation with the wall of said first section; and a sheet rubber hinge secured to adjacent walls of said first and second sections.

13. A rubber sponge receptacle comprising: a plurality of sponge rubber sections provided with complementary recesses therein; a moisture impervious lining for said recesses extending continuously from one section to the other section and forming a flexible hinge therebetween, said lining being perforated adjacent one of said recesses for the escape of moisture through the contiguous cellular sponge rubber portion of the associated section.

14. A rubber sponge receptacle comprising: a plurality of sponge rubber sections provided with complementary recesses therein; a moisture impervious molded lining having re-entrant portions secured within said recesses and extending continuously from one section to the other section to form a flexible hinge therebetween, one of the re-entrant portions of said lining being perforated for the escape of moisture through the contiguous cellular sponge rubber wall of the associated recess.

15. A sponge rubber receptacle comprising: a plurality of sponge rubber sections provided with complementary recesses therein; a rubber lining having recesses formed therein secured within the complementary recesses in said sections and having an intermediate portion forming a hinge connecting said sections.

16. A sponge rubber receptacle comprising: a plurality of sponge rubber sections provided with complementary recesses therein, one of said sections having a skin incorporated therein for reinforcing said receptacle; a molded rubber lining having recesses formed therein secured within the complementary recesses in said sections and having an intermediate portion forming a hinge connecting said sections.

17. A sponge rubber receptacle comprising: a first section provided with a sponge rubber base portion; a peripheral sponge rubber wall secured to said base portion; a second section provided with a sponge rubber cover portion; a peripheral sponge rubber wall secured to one side of said cover portion for cooperation with the wall of said first section; and a rubber lining secured to the base and wall portions of said first section and to the cover and wall of said second section, and providing a flexible hinge connection between said sections.

18. A sponge rubber receptacle comprising: a first section provided with a sponge rubber base portion having a skin on one side only thereof; a peripheral sponge rubber wall secured to the skin side of said base portion, said skin reinforcing said receptacle; a second section provided with a sponge rubber cover portion; a peripheral sponge rubber wall secured to one side of said cover portion for cooperation with the wall of said first section; and a rubber lining secured to the base and wall portions of said first section and to the cover and wall of said second section, and providing a flexible hinge connection between said sections.

19. A sponge rubber receptacle comprising: a first section provided with a sponge rubber base portion; a peripheral sponge rubber wall secured to one side of said base portion; a second section provided with a sponge rubber cover portion having the skin removed from both sides thereof; a peripheral sponge rubber wall secured to one side of said cover portion for cooperation with the wall of said first section and a rubber lining secured to the base and wall portions of said first section and to the cover and wall of said second section, and providing a flexible hinge connection between said sections, said lining being perforated adjacent the cover portion of said second section for the escape of moisture through the cover portion.

20. A sponge rubber receptacle comprising: a first section provided with a sponge rubber base portion having a skin on one side only thereof; a peripheral sponge rubber wall secured to the skin side of said base portion, said skin reinforcing said receptacle; a second section provided with a sponge rubber cover portion having the skin removed from both sides thereof; a perpiheral sponge rubber wall secured to one side of said cover portion for cooperation with the wall of said first section; and a rubber lining secured to the base and wall portions of said first section and to the cover and wall of said second section, and providing a flexible hinge connection between said sections, said lining being perforated adjacent the cover portion of said second section for the escape of moisture through the cover portion.

In testimony whereof I hereunto affix my signature.

THOMAS W. MILLER.